Dec. 18, 1923.

V. J. EMERY 1,477,550

PISTON RING

Filed May 3, 1922

Inventor:
Victor J. Emery,
by Emery, Booth, Janney & Varney
Attys.

Patented Dec. 18, 1923.

1,477,550

UNITED STATES PATENT OFFICE.

VICTOR J. EMERY, OF WOLLASTON, MASSACHUSETTS.

PISTON RING.

Application filed May 3, 1922. Serial No. 558,193.

*To all whom it may concern:*

Be it known that I, VICTOR J. EMERY, a citizen of the United States, and a resident of Wollaston, county of Norfolk, and State of Massachusetts, have invented an Improvement in Piston Rings, of which the following description, in connection with the accompanying drawings, is a specification, like characters on the drawings representing like parts.

This invention relates to piston rings and the purpose is to provide a simple yet particularly effective device of this nature.

My invention will best be understood by reference to the following description of the illustrative embodiment thereof shown by way of example in the accompanying drawing, wherein.

Figure 1:
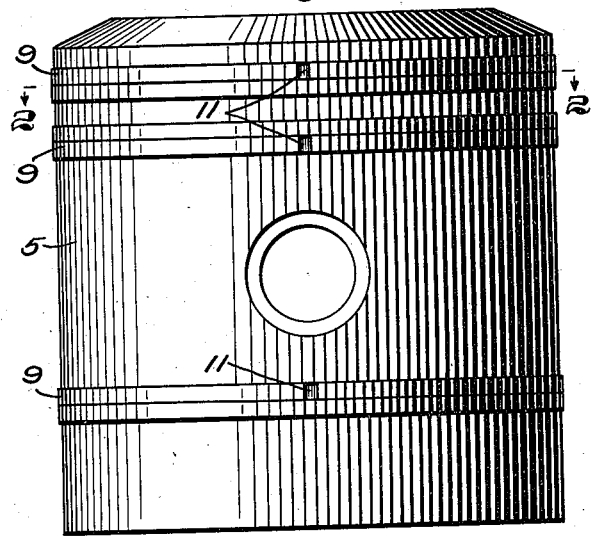
Fig. 1 is a side elevation of a piston equipped with packing rings embodying my invention.
Figure 2:
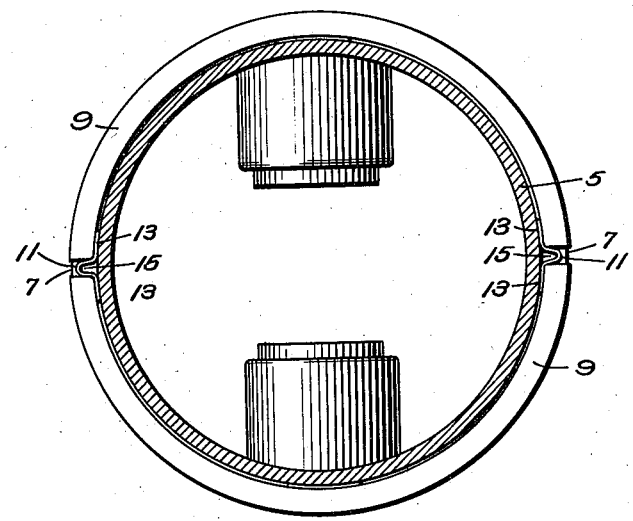
Fig. 2 is a section on the line 2—2 of Fig. 1.

Referring to the drawing, I there illustrate a piston 5 of the type commonly used in internal combustion engines having annular grooves 7 to receive packing rings. These grooves may be and preferably are of uniform depth, the construction of my improved ring not necessitating any special form of groove to permit the same to be used. In each of the grooves 7 may be disposed two or more packing rings which are placed with the joints in the same breaking in well known manner. Since the rings are similar, the description of one as best shown in Fig. 2 will suffice for an understanding of the invention.

I utilize a divided metallic packing ring with a suitable form of spring interposed between the ends thereof to hold the same in contact with the cylinder wall and preferably, as in the form of the invention illustrated, the ring is dividid in two or more places, herein two, to provide a plurality of arc-shaped sections 9. I provide means for pressing these sections outwardly and apart, that is, to exert a pressure thereon both along a tangent at their junction and radially outward of the piston and I will next describe a preferred form of spring which may be utilized for this purpose.

Figure 3:
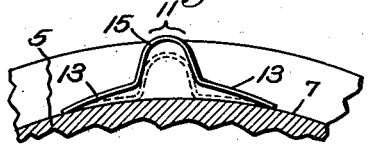
Fig. 3 is a fragmentary section with the ring removed.

Referring to Fig. 3, I utilize a leaf spring 11 formed of a flat strip of resilient metal of about the width of the sections 9 of the piston ring. This is bent to provide two curved basal flanges 13 joined by a bowed portion 15 and in their unstressed position they preferably are related to each other substantially as shown in full lines in Fig. 3. As seen by that figure the connected flanges 13 form an arcuate spring of sharper curvature than the base of the groove 7 and are adapted to be flattened against that base to the dotted line position shown. Similarly the sides of the bowed portion 15 may be somewhat compressed towards each other to the dotted line position. The springs 11 are placed between the ends of the sections 9 of the ring each with the base portions 13 resting in the bottom of the groove and underlying the ring sections and the bowed portion 15 projecting between the ends of the sections and thus serving to maintain the spring in position. The ring sections 9 flatten the portions 13 against the base of the groove and the spring thereby exerts an outward or radial pressure on the sections and at the same time the bowed portion 15 is compressed between adjacent sections and exerts a tangential pressure on the two. This combination of forces attained in this simple manner is very effective in holding the ring in position against the cylinder wall. It will be clear from Figs. 2 and 3 that in the expansion of the spring the distal end of flange 13 will bear on the bottom of the groove and the inner end against the edge of the ring and the flange, fitting the groove, extends as a barier across the space beneath the ring to prevent gas leakage into the same and thence to a gap in an adjacent ring.

It will be noted that the construction of spring is very simple and requires no modification of the piston structure to permit its use. It is positioned by the basal flanges 13 being held between the ring and the piston wall and in another sense is positioned relatively to the ring by the bowed portion 15 projecting between the ends of the ring. When used, as preferably, in connection with a sectional ring as shown, the parts are simply dropped into position and the ring very readily assembled with the piston and the ring sections may be accurately formed to the proper curvature beforehand and are not strained or stressed in assembling them with the piston.

I have described in detail the particular embodiment of my invention shown by way of example in the accompanying drawing. It will be understood, however, that this is the preferred form and that various features of construction specifically referred to might be omitted while utilizing other features to obtain desirable though perhaps less perfect results. My invention in its broader aspects is not limited to the construction shown and what I claim as novel therein and desire to secure by Letters Patent I shall express in more generic fashion in the following claims.

Claims:

1. In combination with a divided piston ring, a spring having a tangentially compressible bowed portion directly interposed between the ends of the ring and having legs of sharper curvature than the ring underlying the same.

2. In combination with a sectional piston ring, springs directly interposed between the sections thereof and having tangentially compressible portions projecting between the ends of the sections and legs of sharper curvature underlying the same.

3. In combination with a piston having a uniform annular groove, a divided ring seated in the groove and a spring having a base portion seated on the bottom of the groove and a bowed portion projecting between the ends of the ring to be compressed therebetween.

4. In combination with a divided piston ring, a leaf spring interposed between the ends of the ring and shaped to be compressed by the ring both radially and tangentially.

5. In combination with a sectional piston ring, springs interposed between the sections consisting of a strip of flat material bent to provide a compressible bow to project between the sections for circumferential compression between the same and a base part to seat on the bottom of the piston groove under the ring.

6. In combination with a piston having a ring-receiving groove, a sectional piston ring received thereby, leaf springs directly interposed between the ring and the walls of the groove at the junction of the sections and having portions adapted to be flattened against the base of the groove by the sections and portions projecting between the ends of the sections to position the springs.

7. In combination with a grooved piston a divided piston ring received in the groove thereof and a leaf spring fitting the groove having a compressible portion adapted to extend between and find bearings on the base of the groove and an end of the ring thereby providing a closure for the portion of the groove underlying the ring.

In testimony whereof, I have signed my name to this specification.

VICTOR J. EMERY.